Figure 1:
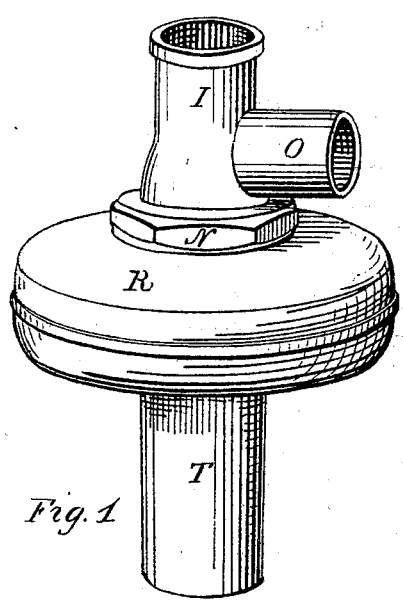

No. 625,899. Patented May 30, 1899.
J. P. PUTNAM.
SEWER GAS TRAP.
(Application filed Jan. 2, 1897.)
(No Model.)

WITNESSES:
Christob Orvis.
Chas. A. Feyhl

INVENTOR
J. Pickering Putnam.

UNITED STATES PATENT OFFICE.

JOHN PICKERING PUTNAM, OF BOSTON, MASSACHUSETTS.

SEWER-GAS TRAP.

SPECIFICATION forming part of Letters Patent No. 625,899, dated May 30, 1899.

Application filed January 2, 1897. Serial No. 617,798. (No model.)

*To all whom it may concern:*

Be it known that I, JOHN PICKERING PUTNAM, of Boston, in the county of Suffolk and State of Massachusetts, have invented a new and useful Improvement in Sewer-Gas Traps, of which the following, taken in connection with the accompanying drawings, is a specification.

The object of my invention is to provide a sewer-gas trap which shall be able to resist siphonage, back pressure, evaporation, sediment deposit, and other adverse influences tending to destroy the seal of traps in plumbing practice; and it relates to that form of sewer-gas trap which relies upon a water seal alone for accomplishing its purpose without the aid of any form of mechanical seal—such as a valve, gate, ball, or other similar device—in the trap.
The usual method now employed in plumbing with a view to preventing the destruction of the seal of traps by siphonage or back pressure is the ventilation of the trap just beyond its seal by a special air-pipe extending to the roof of the house. Experience with this system has now shown us, however, that this so-called "back-vent" pipe introduces a new danger to the seal greater than those it is designed to eliminate, for so long as the vent-pipe properly performs its function of ventilating this very ventilating-current itself rapidly destroys the water seal of the trap by evaporation; but as a matter of fact the vent-pipe very often fails in its effort to supply air to the waste-pipe system quickly enough to protect the trap-seal against siphonage and back pressure, partly because of the great length and many bends of this pipe necessitated in modern tall buildings and partly on account of the gradual diminution of its area through clogging by grease and sediment. It is found that the inertia of a small body of water constituting the seal of an ordinary trap often affords less resistance to the air-pressure of siphonage and back pressure than the friction caused by the walls of the vent-pipe, and accordingly this small body of water is thrown out of the trap and the seal destroyed before the vent-pipe can supply air to relieve it.

The object of my invention, then, is to provide a trap which shall permit air to pass through its own water seal from the inlet-pipe from the fixture which it serves without destroying or seriously impairing this seal. This inlet-pipe and air-passage provided through the trap then becomes the special vent-pipe and supplies or conducts away air in case of siphonage or back pressure without endangering the seal by evaporation, and itself being secure against injury through clogging the expense and complication of the present system of "back venting" are entirely avoided.

I make the waterway through the trap of large size at every point and everywhere nearly corresponding in area to that of the waste-pipe from the fixture, whereby the water discharged therefrom possesses the maximum scouring power both for the trap and for the waste-pipes beyond it.

My invention consists, broadly, in constructing the trap with two chambers—namely, an upper or reservoir chamber and a lower narrow chamber formed by an extension of the waste-pipe downward below the upper chamber, a part of the waste-pipe passing through the upper chamber.

It consists also of certain details of construction hereinafter set forth.

Figure 2:
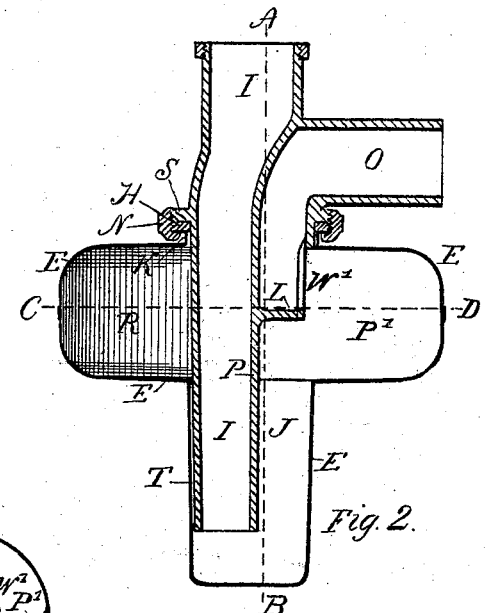
Figure 4:
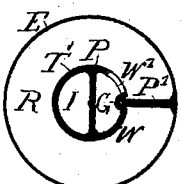
Figure 3:
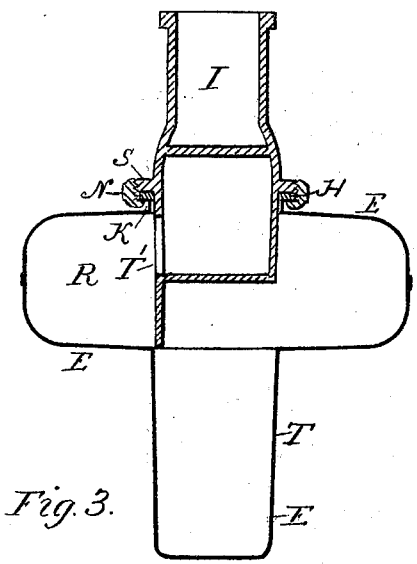

In the drawings, Figure 1 is a perspective view, and Fig. 2 a vertical section, of my trap. Fig. 3 is another vertical section taken along the line A B of Fig. 2. Fig. 4 is a horizontal section taken along the line C D of Fig. 2, but drawn to scale one-half as large as that of the preceding figures.

R is the upper or reservoir chamber, having its bottom surface nearly horizontal, and T is the lower narrow chamber, which I designate as the "trap-chamber," as containing the main portion of the depth of the trap-seal. This chamber is formed by a continuation of the inlet-pipe I from the fixture and its upward return-pipe J. The walls of this chamber are nearly perpendicular under the horizontal bottom of the upper chamber, and therefore make, with the latter, almost a right angle at the point where they meet one another. The area of the lower chamber in horizontal section is not greater than the combined sectional areas of the inlet-pipe I and its return-pipe J.

O is the outlet-pipe from the trap to the sewer.

P is a partition or dividing-wall separating the lower part of the inlet-pipe I from its return portion J. It also separates the upper part of the inlet-pipe from the outlet-pipe O.

L is a horizontal deflecting plate or ledge between the inlet and outlet pipes and located above the bottom of the chamber R. It serves to deflect the water passing through the inlet and outlet pipes into the chamber R.

W is a port below the deflecting-plate L, through which the water passes from the upward-going part J of pipe I into the chamber R.

P' is a partition in the chamber R, extending from near the port W on the wall of the pipe passing through the chamber to the outer wall of said chamber and serving to force the water to pass entirely around the central pipe and through all parts of the chamber R before it passes through a second port W', which enters the outlet-pipe O and is on the opposite side of the partition P' from the port W. In all cases the sectional area of the water-passage through all parts of the trap nowhere greatly exceeds the sectional area of the inlet or outlet pipe, and accordingly, since the partition P' obliges all the water to pass equally through all parts of the trap, all parts are equally scoured and kept clean.

The power of the trap to resist siphonage is, other things being equal, greater in proportion to the greater distance the water has to travel horizontally through the chamber R around the central pipe.

It is not necessary that both pipes I and J should pass through the upper chamber; but it is desirable that either one or both should do this, whereby a central wall is formed in the chamber, around which the water is forced to travel therein a greater distance, and a larger reservoir-chamber is obtained without diminution of scouring effect.

I prefer to so construct the trap that the outer wall E E of both upper and lower chambers is in a single piece and constitutes a casing which may be removed at pleasure for examining the interior of the trap. The joint is located below the normal water-line for greater security against the escape of sewer-gas, but high enough on the casing so that when this casing is removed it will retain without overflowing all the water in the trap. The casing has a flat bottom to stand upon after has been removed.

N is a coupling-nut for securing the casing to the inner part of the trap, and H is a gasket under the nut for making the joint water-tight.

S is a shoulder on the inner part, having a male thread corresponding with the female thread on the nut N.

K is an outwardly-projecting collar around the opening in the casing E E, through which the inner portion of the trap is inserted in the casing, the outer projection of the collar being formed, by a spinning-tool or otherwise, over the inward-projecting flange of the coupling-nut. I prefer to construct this inner part of the trap, as shown in Figs. 2, 3, and 4, in the form of a casting having a circular form in horizontal section, divided by the partition P, and I designate this circular casting as the "tube" T'. On the outer surface of this casting, between the ports W and W', I make a perpendicular groove G, deep and wide enough to receive with a loose fit the inner edge of the partition P', which partition projects a little beyond the upper opening in the casing E E and fits into this groove. The object of this arrangement is to insure the casing E E always occupying the same relative position with regard to the tube T' whenever the casing is replaced after removal, so that the partition P' shall always come between the two ports W and W' and separate them from one another.

The operation of my trap during a normal discharge of waste-water from the fixture is as follows: After the water has entered the trap through the inlet-pipe I it rushes at once to the bottom of the lower chamber, thence rises in the return-pipe J to the deflecting-partition L, by which it is forced to enter the upper chamber R. Here it meets the partition P', which compels it to rush around the central pipe and scour the entire interior of the upper chamber before escaping through the outlet-pipe O from the trap into the waste or drain pipe.

The operation under the abnormal conditions afforded by siphonage or back pressure is as follows: When upon the discharge of a plumbing-fixture a body of water descends the waste-pipes, the water forms a plug or piston which compresses the air below and rarefies the air above it. The compression of the air produces upon the seals of traps connected with the waste-pipe system the phenomenon of "back pressure" and the rarefaction that of "siphonage," the two forces always acting upon a trap-seal alternately and with greater or less violence, according to the arrangement of the piping and the nature of the discharge; but the two forces cannot act violently on any one trap, because the nature of the phenomena is such that at any given point in the waste-pipe system where one is violent the other must of necessity be proportionately weak and harmless.

Back pressure being the first of the two forces to show itself on the water seal after a discharge, as above described, its effect upon my trap will be first considered.

Back pressure is always strongest at the lowest part of a perpendicular run of piping, as where the soil-pipe bends sharply to the horizontal position in the basement of a building, because at this point the escape of the air in the soil-pipe in front of the falling plug of waste-water is retarded by the friction of the sharp bend and by the seal of the main house-trap, as well as by friction against the walls of the pipe. Accordingly back pressure is most to be feared in the lower stories of a building or in the neighborhood of sharp bends in the waste-pipe system. The only way in which this force can be effectually resisted in water-seal traps is by constructing the seal so deep that the weight of the water column composing it shall exceed the force of the back pressure exerted, and the cause and nature of the phenomenon being well known the amount of pressure which it can exert in house plumbing is susceptible of calculation with sufficient accuracy to insure safety. I have found by experiment and calculation that the depth of seal necessary to render a trap secure against this force must be equal to that of the main house-trap plus a certain extra amount to offset friction in the waste-pipe system and that with good plumbing this depth need not exceed ten inches; but instead of constructing the trap with a seal of this full depth it is sufficient to give it an actual depth of seal somewhat less than this, but at the same time a water capacity sufficient to provide a water column of this length in the trap and inlet-pipe from the fixture when the back pressure is being exerted. I have therefore constructed my trap with a seal six inches deep and a water capacity in the reservoir-chamber sufficient to form a column in the inlet-pipe from the fixture it serves at least four inches in height additional, and I find these proportions essential for safety in good plumbing practice. When, now, back pressure from the waste-pipe acts upon the water seal through the outlet-pipe O, the water is forced up the inlet-pipe toward the fixture, lengthening the effective depth of seal by drawing upon the water of the reservoir R until the height of the water column in the trap and inlet-pipe (which thus becomes part of the trap) equals the force of back pressure exerted against it, and the entrance of sewer-gas into the building from this cause is effectually prevented.

When siphonage occurs, the action of the trap is as follows: A partial vacuum in the drain-pipes causes a suction at the outlet-pipe O, or, more scientifically speaking, a diminution of the normal atmospheric pressure on the outlet-pipe end of the trap-seal. Air then presses upon the inlet side of the seal to restore the equilibrium, and this pressure lowers the column of water in the inlet-pipe to the bottom of the seal, throwing an amount of water equivalent to the contents of the inlet-pipe out of the trap. If the siphonage continues, air then passes under the partition P up through the trap and outlet-pipe, forcing with it a certain quantity of water from the top of the reservoir-chamber into the waste-pipe.

Under powerful and long-continued siphonage enough water may be forced out of the trap to lower the level of the seal in the reservoir-chamber to, say, the line C D. Below this line the water cannot be further lowered, for the reason that ample space is now left in the upper chamber above the line C D for the passage of the air without removing the water below it.

During the continuance of the siphonage the lower chamber formed by the inlet-pipe I and its return-pipe J, being narrow, contains only the inrushing air, the water from the reservoir-chamber not having room to enter this narrow chamber while the air is passing through it. Only at that part of the upper chamber above the port W, where the air comes in contact with the horizontal body of water in this chamber in passing upward through it, can the air-current force upward with it a certain quantity of water; but the distance from the upper part of the port W to the lowered surface of the water in the reservoir-chamber being now very small the amount of water raised by the air-current is correspondingly small. The water so raised, however, cannot be driven out of the trap because it is forced against the inner walls of the partition P' and of the reservoir-chamber in its circuitous course through the chamber around the central waste-pipe and, clinging to these walls, follows them downward back into the reservoir, while the lighter air escapes. When finally the partial vacuum in the waste-pipe is filled by the air thus passing through the trap, only a small part of the water in the reservoir-chamber is required to refill the narrow trap-chamber below, and as this chamber is very deep in proportion to its horizontal area the depth of seal in the trap is nearly as great after as before the siphonage took place. It is evident that the larger the diameter of the upper chamber as compared with that of the lower the less effect will siphonage have upon the depth of the water seal. It is evident that a lower trap-chamber, even six inches or more in depth, could be refilled from the reservoir after siphonage without lowering the water therein by more than a quarter or half an inch. Accordingly the efficiency of the trap in resisting siphonage and back pressure depends upon the proportion which the depth and narrowness of the lower chamber bear to the capacity and horizontal extension of the upper chamber. In practice I find the proportions shown in the drawings to be sufficient and in all respects most suitable.

What I claim as my invention, and desire to secure by Letters Patent, is—

1. A sewer-gas trap consisting of an inlet-pipe, an upper and a lower chamber, and an outlet-pipe, the upper chamber consisting of a reservoir surrounding the inlet-pipe and the lower chamber consisting of a narrow water-trap formed of a downward extension of the inlet-pipe below the reservoir-chamber, and an upward return of the same pipe to and opening into the bottom of the reservoir, and the outlet-pipe opening out of the upper part of the upper chamber, substantially as described.

2. A sewer-gas trap consisting of an inlet-pipe, an outlet-pipe, an upper and a lower chamber, the inlet-pipe descending below the upper chamber, and forming there, by a return-bend, the lower chamber; the outlet-pipe being above the inlet-pipe and passing through the upper chamber and having between it and the upward extension of the inlet-pipe a cross-partition, and the inlet and outlet pipes having two openings or ports communicating with the upper chamber, one below and the other above the cross-partition substantially as described.

3. A sewer-gas trap consisting of a perpendicular tube composed of an inlet and an outlet pipe both opening near the top of the tube; an upper chamber and a lower chamber, the upper chamber consisting of a reservoir surrounding the perpendicular tube, and the lower chamber consisting of a downward extension of the tube below the bottom of the reservoir, the inlet and outlet pipes having between them a cross-partition whereby the water is prevented from passing directly from the former into the latter, and having two ports one below and one above the cross-partition both communicating with the upper chamber, substantially as described.

4. A sewer-gas trap consisting of an inlet-pipe, an upper and a lower chamber and an outlet-pipe opening out of the upper chamber, the upper chamber forming a broad reservoir surrounding the inlet-pipe which passes through the same, and the lower chamber consisting of a narrow sinkage or cup in the bottom of the reservoir into which the inlet-pipe descends to within a short distance of its bottom, substantially as described.

5. A sewer-gas trap consisting of an inlet-pipe, an upper chamber, a lower chamber, below and adjoining the upper chamber, and an outlet-pipe, the inlet-pipe passing through the upper chamber, and terminating near the bottom of the lower chamber, the two chambers being partially separated from one another by a wall having an opening or port therein, and the upper chamber having in it a partition extending from the outside of the inlet-pipe to the inside wall of the upper chamber, and separating the inlet-port of the inlet-pipe from the outlet-port of the outlet-pipe, substantially as described.

6. In a sewer-gas trap the combination of the inlet and outlet pipes I and O, the casing E E forming an upper chamber R surrounding said pipes, and a lower chamber T into which the pipe I descends and forms a trap below the upper chamber, ports W and W', ledge L, and partition P', and means for detachably connecting the exterior casing E E to the inner pipes I and O, substantially as described.

7. In a sewer-gas trap the combination of a tube T composed of an inlet-pipe I and an outlet-pipe O, a casing E E forming a chamber R surrounding the tube T and communicating with the inlet-pipe I through the port W and with the outlet-pipe through the port W', a ledge or plate L, a partition P' in the chamber R separating the two ports, and connected with the inner side of the outer wall of the chamber R, and fitting loosely into a perpendicular groove G in the outer wall of the tube T between the two ports W and W', the wall or casing E E being made detachable from the tube T and being provided with means for making a water-tight connection with said tube, the opening in the casing E E for admitting the tube T being just large enough to admit the tube, and the partition P' extending slightly into the opening and fitting into the groove G, substantially as described.

8. In a sewer-gas trap the combination of the tube T composed of an inlet-pipe I and an outlet-pipe O, and having a shoulder S near its upper part threaded with a male thread, a coupling-nut N and packing H, the casing E E forming the chamber R surrounding the tube T and communicating with it through ports W and W', and having within it the partition P', the casing being detachable at its upper part from the tube T, and having an opening below the shoulder S for admitting said tube T, the opening having an outwardly-projecting collar K turned over an inwardly-projecting flange on the coupling-nut, substantially as described.

9. A sewer-gas trap consisting of a perpendicular tube composed of an inlet and an outlet pipe both opening near the top of the tube, a chamber surrounding the tube below the two upper openings, the outlet-pipe within the tube being separated from the inlet-pipe by a cross-partition, and the pipes communicating with the interior of the chamber by two ports one above and one below the partition, substantially as described.

In testimony whereof I have signed my name to this specification, in the presence of two subscribing witnesses, on this 30th day of December, A. D. 1896.

JOHN PICKERING PUTNAM.

Witnesses:
  CHAS. E. HAPGOOD,
  CHAS. A. FEYHL.